SAMUEL CROSSLEY.
Improvement in Cultivators.
No. 124,724.                                         Patented March 19, 1872.
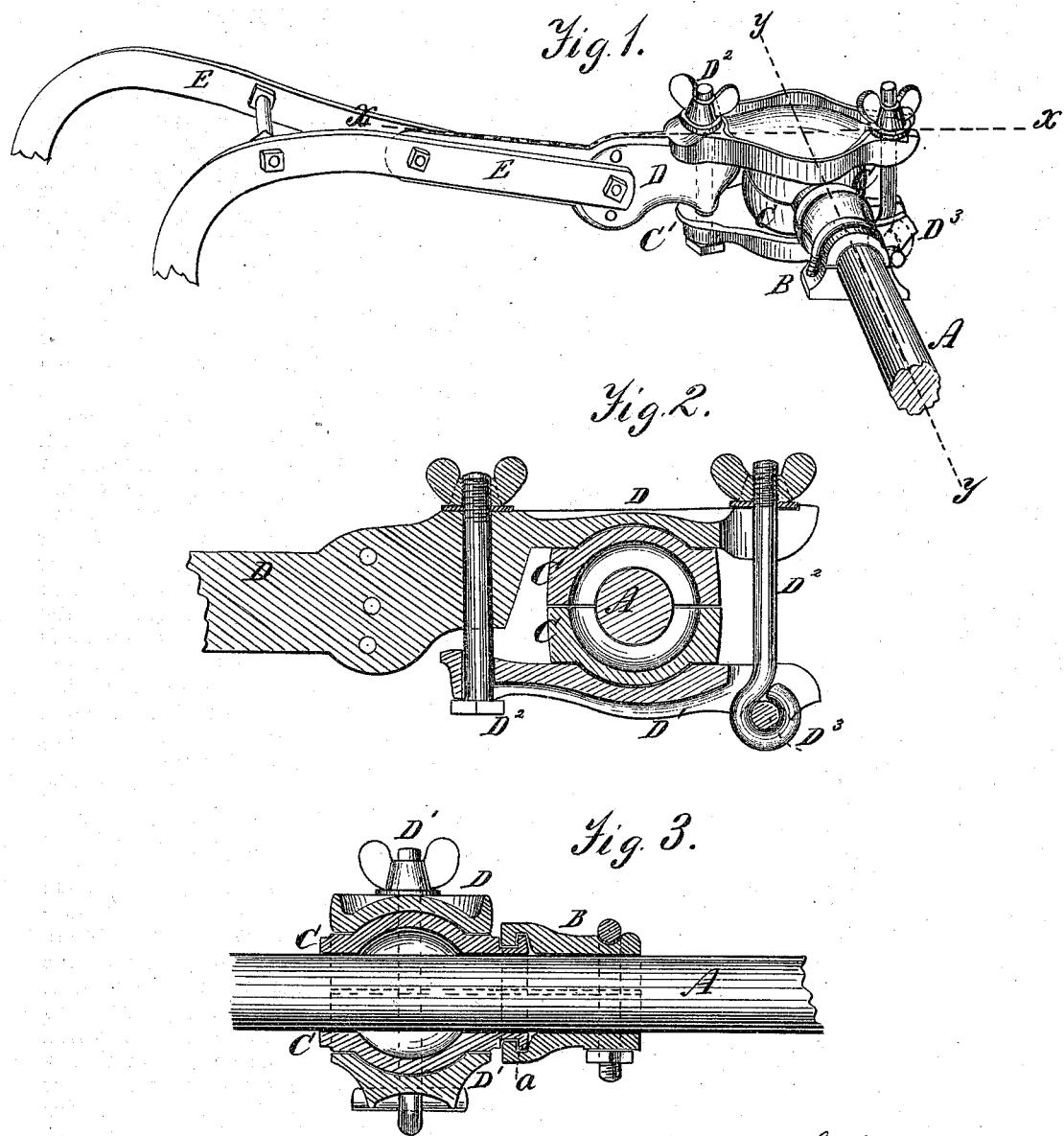

124,724

UNITED STATES PATENT OFFICE.

SAMUEL CROSSLEY, OF ROCK ISLAND, ILLINOIS.

IMPROVEMENT IN CULTIVATORS.

Specification forming part of Letters Patent No. 124,724, dated March 19, 1872.

*To all whom it may concern:*

Be it known that I, SAMUEL CROSSLEY, of Rock Island, in the county of Rock Island and State of Illinois, have invented certain Improvements in Universal Joints for Attaching Cultivators and Plows to Axles; and I do hereby declare that the following is a full, clear, and exact description thereof, reference being had to the annexed drawing making a part of this specification, in which—

Figure 1 is a perspective view of my improved coupling, showing also the beams of a cultivator and a portion of the axle to which it is attached. Fig. 2 is a sectional elevation on line $x$ $x$ of Fig. 1, showing the boxes in which the shaft is carried, the caps which cover the boxes, the clamping-screws, and the wooden pins for allowing the parts to be disconnected in case of accident. Fig. 3 is a sectional elevation on line $y$ $y$ of Fig. 1, showing the axle, the clamp which secures the boxes upon the axle, and the wooden safety-pin.

Corresponding letters refer to corresponding parts in the figures.

This invention relates to joints which are to be used for coupling plows or cultivator-beams to the axles of the carriage which carries their forward ends, it being designed to provide for such purposes a universal joint, or one which shall permit of a free vertical and lateral movement of the beam, and consequently of the plows or shovels attached thereto; and it consists in the construction, combination, and arrangement of the parts of which it is composed, as will be more fully described hereinafter.

In constructing joints of this character, I use an axle of any approved form, which may be bent upward to permit it to pass over the growing plants, or it may be straight, as preferred. The outer ends of this axle A, or those portions to which the joint is to be attached, are so constructed as to receive the clamps which carry the boxes in which the axle is carried, and also so as to furnish a bearing for such boxes and for the wheels. Upon the axle at the proper points there are placed clamps B B, which consist of two pieces of metal which have semicircular recesses in them, or recesses made to fit that portion of the axle upon which the clamp is fastened, and their outer ends have an annular groove formed in them, as shown at $a$, to receive a flange formed upon the boxes, while near their inner ends there is formed a groove to receive the staple or yoke which secures them to the axle. To provide for the release of the clamp on the forward end of the beam from the axle when the plow or cultivator-teeth come in contact with any obstruction that would otherwise be likely to cause damage to the machine, the boxes C C are made in substantially the form shown in the drawing—that is, with a portion of their outer surfaces convex, or of any equivalent form—in order that, in the event above alluded to, such surfaces shall act as a wedge and force the two sections of the clamp on the plow-beam apart, and thus permit the boxes to pass out of such clamp. The inner surface-boxes may be of the concave form shown, or they may have any other form which will give them sufficient bearing-surface upon the axle. Their inner ends are provided with a flange to enter the groove formed in the clamp B, in which they turn in the vertical movements of the beam. The forward end of each plow-beam is provided with a clamp, consisting of two sections, D D$^1$, to embrace the boxes C C upon the axle. The upper portion of this clamp is made substantially as shown in Figs. 1 and 2, its rear end being provided with an arm to which to attach the beams of the cultivator, as shown, its outer end being provided with a hole to receive a bolt, while near that portion which forms the clamp for the boxes it has a series of holes formed in it, through which the bolt securing the front end of the beam passes in order that the plows may be set to incline more or less. The under portion D$^1$ of the clamp is shorter than the upper portion D, as shown in Fig. 2, it being only long enough to receive the clamping-bolts D$^2$ D$^2$; for which purpose it has a hole at its rear end which corresponds with one in the upper portion, for the passage of one of such bolts. In the under surface of this lower portion of the clamp there is formed a seat for a wooden pin, D$^3$, while its outer end is provided with a slot open at its outer end, so that, in the event of the plow or tooth of the cultivator coming in contact with any obstruction, as above stated, the pin will be broken and the bolt be carried forward, and thus the two sections of the clamp will be allowed to open and allow the boxes to pass out of it, and any accident to the plows or their beams will be prevented. The upper portion of the clamp is also provided with a slot in its front end for the purpose of allowing the clamping-bolt to pass out, for the purpose of facilitating the operation above described. In order that the wedging process for separating the two portions of this clamp may be effected, the inner surfaces of its parts D and D¹ are made concave to receive the convex portions of the boxes, as shown in Figs. 2 and 3. The bolt which passes through the slot in the forward end of the clamp has an eye formed in its lower end for the passage of the wooden pin D³, which pin may be made of any required diameter and strength, so that it may break and release the parts whenever the cultivator-teeth encounter unusual resistance. When the parts are in the position shown in Fig. 1, or when the machine is in use, or at any time when desirable, the rear ends of the beam and its plows or teeth may be moved laterally to any extent, as a consequence of the concavity in the clamp and of the convex or rounded projection upon the boxes.

What I claim as my invention, and desire to secure by Letters Patent, is—

1. The clamp B, constructed substantially as and for the purpose set forth.

2. The boxes C C, when constructed with convex outer surfaces, for the purpose of retaining them within the clamps when in ordinary use, and also for causing them to separate said clamps when the plows meet with an unusual obstruction, the parts being arranged substantially as set forth.

3. The clamps D D¹, constructed with concave cavities upon their inner surfaces and with slots in their front ends to allow the bolt to pass out through, substantially as and for the purpose set forth.

4. The combination, in a plow or cultivator, of the two portions of the clamp D D¹ and the clamping-bolts, when one of such bolts is provided with a wooden pin, substantially as and for the purpose set forth.

5. The combination of the clamp D D¹, the boxes C, the clamp B, and the axle of a plow or cultivator, substantially as and for the purpose set forth.

In testimony whereof I have signed my name to this specification in the presence of two subscribing witnesses.

SAMUEL CROSSLEY.

Witnesses:
EDWARD GEORGE,
AMOS ALTIMUS.